G. G. BAYNE.
AUXILIARY RADIUS TRUSS FOR AUTOMOBILES.
APPLICATION FILED DEC. 24, 1917.
1,350,771.
Patented Aug. 24, 1920.
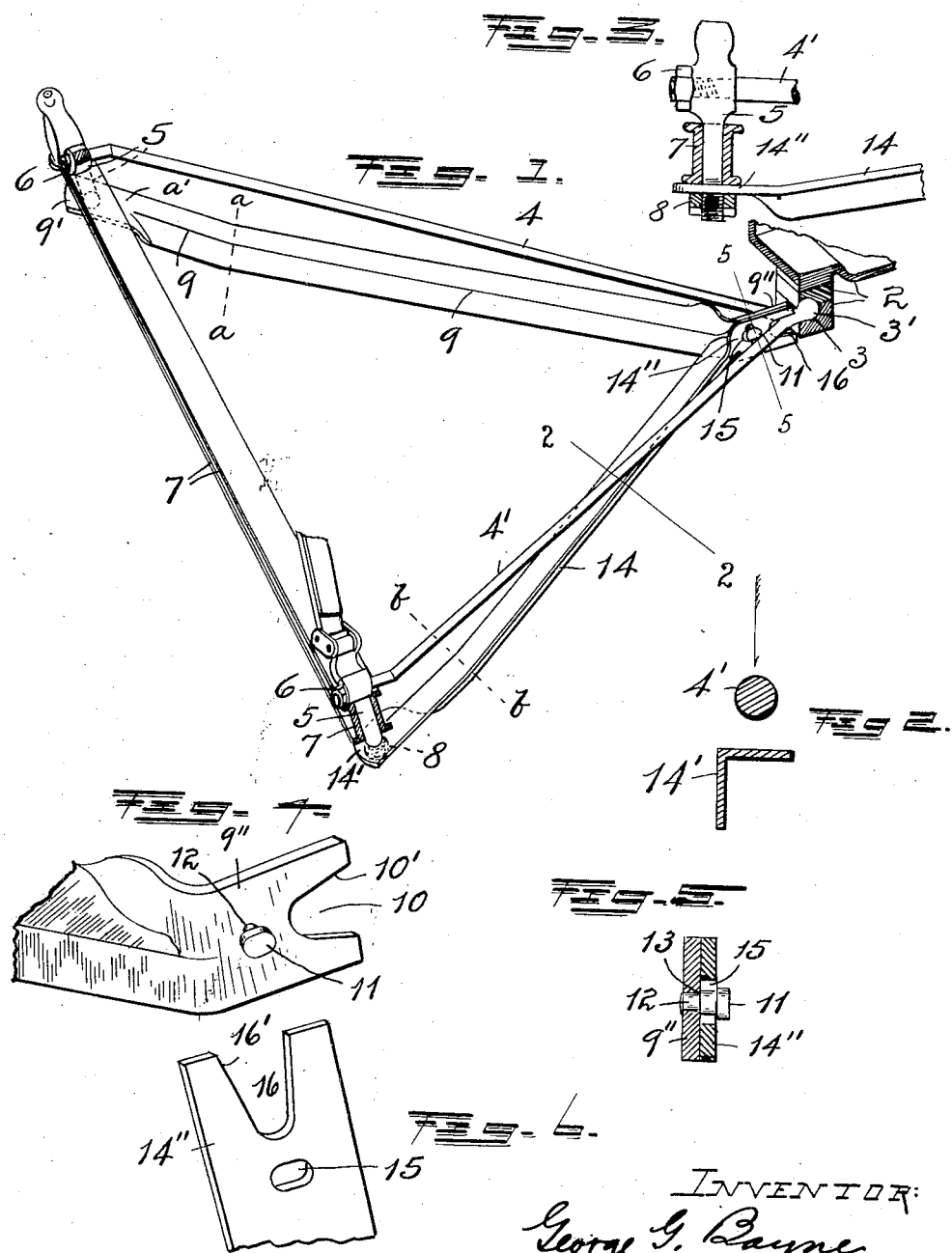

UNITED STATES PATENT OFFICE.

GEORGE G. BAYNE, OF BUSHNELL, ILLINOIS.

AUXILIARY RADIUS-TRUSS FOR AUTOMOBILES.

1,350,771.  Specification of Letters Patent.  Patented Aug. 24, 1920.

Application filed December 24, 1917. Serial No. 208,631.

*To all whom it may concern:*

Be it known that I, GEORGE G. BAYNE, a citizen of the United States, residing at Bushnell, in the county of McDonough and State of Illinois, have invented a new and useful Auxiliary Radius-Truss for Automobiles, of which the following is a specification.

Automobiles of a certain well known type are initially equipped with a pair of radius-rods comprising a pair of convergent bars or rods having at their apex a ball-terminal which seats in the socket of a projection from the engine and crank-case, the rear-ends of the rods being connected with the front axle. The purpose of these radius-rods is to stiffen and to hold in position the front axle of the car. It has been found, however, that the rods frequently buckle and that they are inadequate to effectively carry out this object. The principal object of my invention is, therefore, to provide a novel auxiliary radius-truss which when used in connection with a set of those above described will so strengthen and hold the axle that practically all danger of its being bent or distorted by reason of the violent thrusts and shocks incident to use is eliminated.

Another object resides in so constructing the auxiliary radius-irons that their rear ends are supported by but not connected to the crank-case-projection or any other part of the automobile, for a purpose hereinafter set forth.

A still further object is to provide a novel connection for the converging ends of the auxiliary rods or irons, for a purpose hereinafter more fully set forth.

It is another object to so construct, arrange and position the respective auxiliary rods that results superior to those had from the use of prior devices of like nature will be attained.

The invention consists, substantially, in the improvements hereinafter described.

In the accompanying drawings, which show a preferred embodiment of the invention:

Figure 1 is a perspective of a preferred embodiment of my inmprovements and of parts of an automobile with which they coact;

Fig. 2, a transverse section in the line 2—2 in Fig. 1;

Fig. 3, a side elevation, partly in section, illustrating the connection of one of the radius-rods and one of the auxiliary rods or trusses with the axle;

Fig. 4, an enlarged detail of the rear end of one of the auxiliary rods;

Fig. 5, a transverse section, its plane taken in the line 5—5 in Fig. 1; and

Fig. 6 an enlarged detail of the rear end of that auxiliary rod which connects with the one shown in Fig. 4.

Considering the drawings in detail, 2 indicates a part of the chassis of a conventional automobile, provided with a socket 3 which receives the ball-terminal 3′ of a united pair of radius-rods 4, 4′ the free ends of which pass each through an opening in a spring-hanger 5 and are secured thereto by a nut 6. The lower portion of each hanger constitutes a bolt which passes vertically through an opening in the front axle 7 and is secured thereto by a nut 8. All the foregoing parts are those of a well known automobile and taken alone constitute no part of the invention.

9 indicates an auxiliary radius or truss-rod formed preferably from a strip of L-shaped angle-iron. Its forward portion is inclined slightly upward, as shown by the dotted line $a$, $a$, Fig. 1, and its horizontally arranged forward end 9′ is flattened at $a'$ and provided with an aperture for the passage of the bolt 5. The rear end portion 9″ of the rod also is flattened but it lies vertically at a right angle to the forward end and its extremity is provided with a notch 10. 11 denotes a button the terminal of the shank 12 of which is riveted into an opening in said rear end and the head of which is oblong, for a purpose which soon will be described. In order to hold the button from displacement its shank is shouldered as shown at 13, Fig. 5.

The co-acting auxiliary radius or truss-rod 14 also is formed preferably from a strip of angle-iron, and has its forward portion inclined slightly upward as shown by the dotted line $b$, $b$, Fig. 1. The forward portion, 14′, is flattened, lies in a horizontal plane immediately beneath the axle 7, and has an aperture for the passage of the co-acting bolt 5. Its rear end portion 14″ is flattened and lies substantially at a right angle to its forward end portion, in order that it may present a flat face to the corresponding and contiguous face of the rod 9.

A slot 15, sufficiently large for the passage of the oblong button 11 when its major radius is presented to the major dimension of the slot, but which is narrower than said major radius, is cut in the flattened portion 14″ to be engaged by said button, and a notch 16 adapted to register with the notch 10 is cut in the rear extremity thereof.

It will be noted that one of the branches of each auxiliary rod lies horizontally and the other branch vertically, and that the latter is directed downward. This is functional, for when thrust pressure is exerted, especially at the bends $a$, $a$ and $b$, $b$, the tendency will be to buckle downward at those points, and inasmuch as the buckling would be accompanied by a pushing or compression strain upon the horizontal branch and a consequent pulling or stretching strain on the the vertical branch, it would require the application of a much greater force to stretch the vertical branch than to compress the horizontal one; therefore the rods, when positioned as shown, with their horizontal branches uppermost, will withstand a greater thrust than they would if the vertical branch were uppermost, for in that event it would not require any great downward pressure to cause the already-bent vertical branch to collapse, and the horizontal branch, being beneath it, would offer but a minimum of resistance. Should any other form or type of angle-iron than an L-shaped one—for instance, a T-iron—be used, a like arrangement of the branches is to be followed out. It may be added that if the branches are arranged as last described they form a sort of channel in which mud will collect and be held, while when they are arranged as shown in the drawings but little mud will lodge on the horizontal branch and that will be shaken off as soon as it dries.

Before attaching the truss to the automobile the rods 9 and 14 are to be held at right angles to each other, their rear ends being adjacent, whereby to permit the head of the button 11 to pass through the slot 15, and are to then be turned into the positions shown in Fig. 1, wherein the button-head will lie across the slot and lock the truss-members together at that point. The larger portion of the shaft or stem 12 is relatively the same as the minor diameter of the slot 15 and thereby prevents endwise play of the truss-members relatively to each other, and the latter are held from vertical movements relative to each other by reason of the fitting of the notches 10 and 16 on the forked terminal of the rods 4 and 4′.

To attach the improvements to an automobile equipped with the radius-rods 4, 4′ the nuts 8 are to be removed, whereupon the forked ends of the truss-members 9 and 14 are to be positioned to straddle the forked rear end of the rods 4, 4′, the bolts 5 inserted through the holes in the forward ends of the truss-members, and the nuts 8 replaced. No fastening or connecting element is required to support the rear end of the truss 9—14, for while it is supported by the fork of the apex, by reason of the walls 10′ and 16′ of the notches 10 and 16 respectively, resting thereon, no connecting or attaching means, such as bolts, nuts, clamps or the like, is required to hold it in place; in other words, the rear end of the auxiliary truss is merely sustained by the fork of the primary radius-rods and is free to move thereon, inasmuch as it is not attached or connected thereto. The utility and advantage of this feature will be apparent, for the operator is saved the disagreeable task of crawling beneath the automobile and lying on his back underneath the greasy and dirty crank-case, in order to apply any attaching or connecting devices. Furthermore, owing to the multiplicity of shocks and vibrations imposed upon them, such devices, especially if the means constituting the connection consists in or includes bolts and nuts, will soon work loose and necessitate a repetition of the disagreeable task above referred to. Moreover, should it become necessary to repair an auxiliary-truss which includes such attaching and detaching elements, it again becomes necessary for the operator to crawl under the machine in order to detach the members forming the connection.

To remove the auxiliary truss 9—14 all that is required to be done is to remove the nuts 8, thus allowing the truss to fall of its own accord free from the bolts 5 and fork of the rods 4, 4′, for as there is no connection with said fork there is nothing to detach in order to permit such movement.

Having thus described the nature of my invention I claim as new the following, to-wit:

1. In an automobile, a pair of truss-rods arranged to form a truss having a rearwardly projected apex, one of them having an elongated slot near its rear end, and a button secured to and projecting from the other rod and having an oblong head adapted when in one position to pass through said slot and when in another position to lie across and extend beyond its side walls, means for connecting the front ends of said rods to the front axle of the automobile, and means for supporting their rear ends.

2. Auxiliary automobile radius rods, comprising a pair of members normally separate to facilitate packing, provided with companion ends contacting in a vertical plane, including original radius rod crotch engaging means, and having interlocking means; and means including flattened portions at the other ends to be secured to the common securing means of said original radius rod.

3. Auxiliary radius rods comprising a pair of members normally separate to facilitate transportation, and including devices on companion ends, arranged to be fitted together by holding said members in certain relative positions, and then to be interlocked by moving said members into the finally set up position.

4. An auxiliary radius rod construction, comprising a pair of suitably constructed radius rod members terminating in notched ends providing a forked head for free application to the crotch of original radius rods, and provided with suitably formed portions at the other ends, for attachment to portions of the original radius rod securing means; and means releasably interlocking the ends constituting the forked head together, including an opening in one end and an insertible member on the companion end.

5. The combination, with an automobile axle, original radius rods including a crotch, with the ends suitably secured on top of the axle; of auxiliary radius rods applicable to the aforesaid combination to prevent backward twisting of the axle, comprising a pair of separable members merging into a head with a fork freely applicable to the crotch, and suitably formed ends arranged to be affixed to portions of the original radius rod securing means below said axle.

GEORGE G. BAYNE.